(12) United States Patent
Braff (10) Patent No.: US 10,672,008 B2
(45) Date of Patent: Jun. 2, 2020

(54) SYSTEM AND METHOD FOR DATA ANALYTICS

(71) Applicant: JPMorgan Chase Bank, N.A., New York, NY (US)

(72) Inventor: Adam Braff, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 78 days.

(21) Appl. No.: 14/547,219

(22) Filed: Nov. 19, 2014

(65) Prior Publication Data

US 2015/0073954 A1 Mar. 12, 2015

Related U.S. Application Data

(63) Continuation of application No. 14/097,830, filed on Dec. 5, 2013.
(Continued)

(51) Int. Cl.
*G06Q 30/00* (2012.01)
*G06Q 40/00* (2012.01)
(Continued)

(52) U.S. Cl.
CPC ............ *G06Q 30/00* (2013.01); *G06Q 40/00* (2013.01); *G06Q 10/067* (2013.01);
(Continued)

(58) Field of Classification Search
CPC ........... G06Q 30/0255; G06Q 30/0235; G06Q 10/105; G06Q 10/103; G06Q 10/067;
(Continued)

(56) References Cited

U.S. PATENT DOCUMENTS 5,842,421 A 12/1998 Desilets et al.
6,029,195 A 2/2000 Herz
(Continued)

FOREIGN PATENT DOCUMENTS

WO WO 01/11532 2/2001

OTHER PUBLICATIONS

Camenisch et al., Privacy and identity management for everyone, Conference: Proceedings of the 2005 Workshop on Digital Identity Management, Fairfax, VA, USA, Nov. 11, 2005 (Year: 2005).*
(Continued)

*Primary Examiner* — Patricia H Munson
*Assistant Examiner* — Uche Byrd
(74) *Attorney, Agent, or Firm* — Greenblum & Bernstein, P.L.C.

(57) ABSTRACT

The invention relates to a system and method for providing anonymized, filtered data from a financial institution having cardholders to a business client. The method may include the steps of storing data in at least one database. The data may include credit card transaction data and debit card transaction data maintained by the financial institution, cardholder demographic data maintained by the financial institution, and other data maintained by the business client. The method may also implement a heuristic process to clean the data. Further, the method may comprise providing an interface for the business client to allow the business client to filter and display the data. The interface can anonymize the data to safeguard the privacy of the cardholders, receive input from the business client as to desired filtering criteria, wherein the filtering criteria include time period, geographic region, type of merchant, and cardholder demographic data, and present the anonymized, filtered data to the business client. The invention can thus enable improved decision
(Continued)

making by the business client in various promotions, investments and other transactions.

9 Claims, 1 Drawing Sheet

Related U.S. Application Data (60) Provisional application No. 61/734,319, filed on Dec. 6, 2012.

(51) Int. Cl.
| | |
|---|---|
| G06Q 10/06 | (2012.01) |
| G06Q 10/10 | (2012.01) |
| G06Q 30/02 | (2012.01) |
| G06Q 30/06 | (2012.01) |

(52) U.S. Cl.
CPC ..... *G06Q 10/06315* (2013.01); *G06Q 10/103* (2013.01); *G06Q 10/105* (2013.01); *G06Q 30/02* (2013.01); *G06Q 30/0235* (2013.01); *G06Q 30/0255* (2013.01); *G06Q 30/06* (2013.01)

(58) Field of Classification Search
CPC .. G06Q 30/02; G06Q 10/06315; G06Q 40/00; G06Q 30/00; G06Q 30/06; H04Q 7/20
USPC .............................................. 705/7.11–7.42
See application file for complete search history.

(56) References Cited

U.S. PATENT DOCUMENTS

| | | | |
|---|---|---|---|
| 6,285,983 | B1 | 9/2001 | Jenkins |
| 6,404,866 | B1 | 6/2002 | Hopper et al. |
| 6,405,175 | B1 | 6/2002 | Ng |
| 6,405,181 | B2 | 6/2002 | Lent et al. |
| 6,409,080 | B2 | 6/2002 | Kawagishi |
| 6,411,947 | B1 | 6/2002 | Rice et al. |
| 6,424,947 | B1 | 7/2002 | Tsuria et al. |
| 6,424,951 | B1 | 7/2002 | Shurling et al. |
| 6,430,539 | B1 | 8/2002 | Lazarus et al. |
| 6,434,534 | B1 | 8/2002 | Walker et al. |
| 6,487,539 | B1 | 11/2002 | Aggarwal et al. |
| 6,505,168 | B1 | 1/2003 | Rothman et al. |
| 6,513,019 | B2 | 2/2003 | Deaton et al. |
| 6,564,189 | B1 | 5/2003 | Nycz |
| 6,567,791 | B2 | 5/2003 | Lent et al. |
| 6,571,216 | B1 | 5/2003 | Garg et al. |
| 6,578,012 | B1 | 6/2003 | Storey |
| 6,587,835 | B1 | 7/2003 | Treyz et al. |
| RE38,717 | E | 3/2005 | Bothwell |
| 7,200,578 | B2 | 4/2007 | Paltenghe et al. |
| 7,747,762 | B2 | 6/2010 | Ohlsen et al. |
| 8,032,438 | B1* | 10/2011 | Barton et al. .................. 705/35 |
| 8,175,908 | B1 | 5/2012 | Anderson |
| 8,326,694 | B2 | 12/2012 | Patel et al. |
| 8,812,351 | B2 | 8/2014 | Zollino et al. |
| 9,799,078 | B2* | 10/2017 | Winters ................. G06Q 20/10 |
| 2002/0052776 | A1 | 5/2002 | Rothman et al. |
| 2002/0091650 | A1 | 7/2002 | Ellis |
| 2003/0163416 | A1 | 8/2003 | Kitajima |
| 2003/0225786 | A1 | 12/2003 | Hall et al. |
| 2005/0183002 | A1 | 8/2005 | Chapus |
| 2006/0020924 | A1 | 1/2006 | Lo et al. |
| 2007/0156530 | A1 | 7/2007 | Schmitt et al. |
| 2009/0132347 | A1 | 5/2009 | Anderson et al. |
| 2009/0248506 | A1* | 10/2009 | Goldstein .......... G06Q 30/0226 705/14.27 |
| 2010/0313009 | A1 | 12/2010 | Combet et al. |
| 2011/0035288 | A1 | 2/2011 | Clyne |
| 2011/0218838 | A1 | 9/2011 | Byce et al. |
| 2011/0231223 | A1* | 9/2011 | Winters ....................... 705/7.29 |
| 2011/0246273 | A1 | 10/2011 | Yarvis et al. |
| 2011/0258028 | A1 | 10/2011 | Satyavolu et al. |
| 2012/0010932 | A1 | 1/2012 | Satyavolu et al. |
| 2012/0066045 | A1 | 3/2012 | Schmitt et al. |
| 2012/0323612 | A1* | 12/2012 | Callaghan .............. G06Q 10/02 705/5 |
| 2013/0124263 | A1* | 5/2013 | Amaro ................... G06Q 30/02 705/7.34 |
| 2013/0231974 | A1* | 9/2013 | Harris ................ G06Q 30/0201 705/7.29 |

OTHER PUBLICATIONS

Lora Albernathy, "25 Percent of Dollars Spent Are Local," Wilmington News Journal (Sep. 24, 2012). Retrieved on Oct. 31, 2012 from the Internet: <URL: http://wnewsj.com>.

Steve LaValle et al., "Big Data, Analytics and the Path From Insights to Value," MIT Sloan Management Review, vol. 52, No. 2, Winter 2011, pp. 21-31.

Krishnan Parasuraman, The Big Data Hub, Understanding big data for the enterprise retrieved on Sep. 26, 2014 from the Internet: URL:http://web.archive.org/web/20121115095846/http://www.ibmbigdatahub.com/blog/part-iii-ibm%E2%80%99s-strategy-big-data-and-analytics.

Big Data & Advanced Analytics, McKinsey & Company, Inc., retrieved on Sep. 24, 2014 from the Internet: <URL:http://web.archive.org/web/20121201010025/http://www.mckinsey.com/client_service/retail/expertise/big_data_and_advanced_analytics>.

"Making Sense of Big Data in Real Time: Metamarkets CEO Michael Driscoll to Speak at Data 2.0 Summit," Mobility Techzone: Business Wire, retrieved on Sep. 24, 2014 from the Internet: <URL:http://www.mobilitytechzone.com/news/2012/04/02/6229664.htm>.

Mary Elizabeth Hurn, AmEx debuts consulting and analytics arm for business customers. Direct Marketing News (Nov. 19, 2009), retrieved on Sep. 26, 2014 from the Internet: <URL: http://www.dmnews.com/amex-debuts-consulting-and-analytics-arm-for-business-customers/article/158099/>.

United States Patent and Trademark Office. Non-Final Office Action (U.S. Appl. No. 13/448,815), dated Dec. 18, 2013.

United States Patent and Trademark Office. Final Office Action (U.S. Appl. No. 10/638,648), dated May 2, 2014.

United States Patent and Trademark Office. Final Office Action (U.S. Appl. No. 10/638,643), dated Mar. 14, 2014.

Utility U.S. Appl. No. 13/448,815, (Anderson, Russell Wayne), filed Apr. 17, 2012.

Utility U.S. Appl. No. 10/638,648, (Anderson, Russell Wayne), filed Aug. 12, 2003.

Utility U.S. Appl. No. 10/638,643, (Anderson, Russell Wayne), filed Aug. 12, 2003.

* cited by examiner

SYSTEM AND METHOD FOR DATA ANALYTICS

CROSS-REFERENCE TO RELATED APPLICATIONS

This application is a continuation of U.S. application Ser. No. 14/097,830 filed Dec. 5, 2013, which is related to and claims priority to U.S. Provisional Application Ser. No. 61/734,319 filed Dec. 6, 2012, both of which are incorporated herein by reference in their entirety.

FIELD OF THE INVENTION

The present invention relates generally to information technology, and more particularly to a system and method for generating processed, anonymized financial information and other information for a business to allow for improved decision making by the business in various promotions, investments and other transactions.

BACKGROUND

Traditionally, businesses have had access to certain types of information that they use to make important business decisions, such as whether and where to build new retail stores or how best to allocate marketing dollars to certain types of customers, business segments, or geographies. Such investments can be substantial and can result in significant losses if underlying assumptions prove to be inaccurate. With the increasing volume and availability of digital information, opportunities exist for improved data analysis. However, the mere existence of voluminous amounts of data does not translate into better business decisions. It is generally advantageous or necessary to selectively identify and process the data in order to provide an improved predictive result. Exemplary embodiments of the present invention address this need and can provide advantages to businesses in making decisions regarding investments, promotions, day-to-day operations management decisions, and other transactions.

SUMMARY

According to one embodiment, the invention relates to a system and a method that can be executed by a financial institution to provide anonymized, processed financial information and other information to a business client of the financial institution. The financial institution may be a bank, for example, that issues credit cards and debit cards and that provides other financial services to its customers. The business client may be a third party client of the financial institution, such as a national retailer or hotel chain, or it may be an internal client, such as a division of the financial institution responsible for opening new retail bank branches. The system and method may be used by the business client to estimate economic opportunity in a particular geographic region. The system and method may also be used by the business client to evaluate consumer spending trends over time defined by various parameters such as consumer demographics, geography, and type of merchant. The system and method may have numerous other uses for a business client interested in closely analyzing business performance and opportunities.

One step of the exemplary method, which may be executed by the financial institution, involves selecting and storing various financial information and other related information in a database. The financial institution may select and store in a database data on credit card and debit card transactions executed by its cardholders, for example, as well as other information relating to its cardholders. The financial institution may also receive data from or on behalf of the business client that is relevant to the analysis to be performed by the business client, such as the address of store locations of the business client or historical data on marketing campaign dollars spent by the business client and sales that appeared (from the business client's observations) to have resulted.

A second step of the method involves preparing the data that has been stored in the database for use by the end user of the business client. For example, the system may include a tool that allows the business client or the financial institution to define a relevant set of stores of the business client to be analyzed, select a business segment comprising aggregate data on businesses in the same field, and/or define a set of customized views of the data that tell a useful business story for the end user of the business client. The second step may also include heuristic processing of the data to enhance the accuracy or usefulness of the data. For example, the heuristic processing may comprise identification of store street addresses, correlation or linking of store locations to merchant names and parent companies at multiple hierarchical layers, accurate classification of merchants by industry, or linking in the database of merchants to structured data sets such as a Dun & Bradstreet data set that provides complementary information about small businesses.

A third step of the exemplary method involves aggregating and/or processing the data in various ways to render the data useful for the business client while keeping the data anonymized (e.g., keeping the data from being identifiable back to individual cardholders, households or businesses other than the business that is using the invention). For example, the financial institution may aggregate the data to the level of a zip code or collection of zip codes, a radius defined by a driving time ("drive-time radius"), or geographical regions defined by a polygon or other shape containing at least a certain minimum population. The third step includes the enforcement of rules by the financial institution to safeguard the privacy and data security of individuals, households, and businesses as well as reputational considerations for the financial institution that are not necessarily required by law, but which give their business clients confidence that their information will similarly not be shared in undiluted form with their own competitors.

A fourth step involves providing a user interface for one or more end users of the business client to allow the end users to explore the data in an interactive way on a computing device such as a desktop computer, laptop computer, tablet, or mobile phone. The user interface (e.g., a graphical user interface) may allow an end user at the business client to input various instructions or criteria for processing (e.g., filtering) the data. As one example, the system and method may be used by a business client to estimate economic opportunity in a geographic region by displaying localized aggregate spending information defined by various factors. This information may be used by the business client to improve decision making as to new retail locations or footprint performance management (that is, understanding which of the business client's stores are performing well or poorly relative to the footprint of other merchants or locally residing customers in an area around that store). The data may be presented, for example, with a choropleth map (also sometimes referred to as a heatmap), e.g., a geographical map showing a factor or variable, the intensity of which is depicted by different colors, shades, or symbols. As another example, the system and method may be used by the business client to evaluate consumer spending trends over time defined by various parameters such as consumer demographics, geography, and merchant category. This information may be used by the business client to understand customer responses to its marketing campaigns, overall performance trends of an industry or merchant category, performance of the business client within a particular merchant category, and spending trends relative to days of the week and time of day, for example. To a typical business client, information about market share (i.e., the share of customers' spending in the relevant industry market and geography) is difficult to come by and is often based on surveys and other low-sample-size data sources. Exemplary embodiments of the invention can overcome these sample size issues by virtue of where the data come from—large volumes of transactions happening in the ordinary course of business, and not sampled down—and can thereby provide valuable competitive intelligence. This may be especially true for small and medium-sized businesses, which may lack the scale and resources to do their own competitive market share analyses.

Exemplary embodiments of the invention can thus provide an interactive and informative tool to allow a business client to understand commercial circumstances in a particular geographical area and merchant category, while safeguarding the privacy and data security of individuals, households and businesses. The business client is then able to make more informed business decisions such as how aggressively to invest in growth, whether to invest in an adjacent industry or geography, where to build a new retail store, the characteristics of the population to target for particular products or services, the timing of offers, staffing decisions, opening hours, the marketing campaigns that have produced the best results, and/or whether to invest in a particular business, for example. Exemplary embodiments of the invention can provide such advantages without providing specifics as to which particular customers or households to target, and without providing mailing lists, so that individual privacy and data are fully protected.

BRIEF DESCRIPTION OF THE DRAWINGS

In order to facilitate a fuller understanding of the present invention, reference is now made to the attached drawings. These drawings should not be construed as limiting the present invention, but are intended only to be examples of embodiments of the invention.

DETAILED DESCRIPTION OF THE PREFERRED EMBODIMENTS

Figure 1:
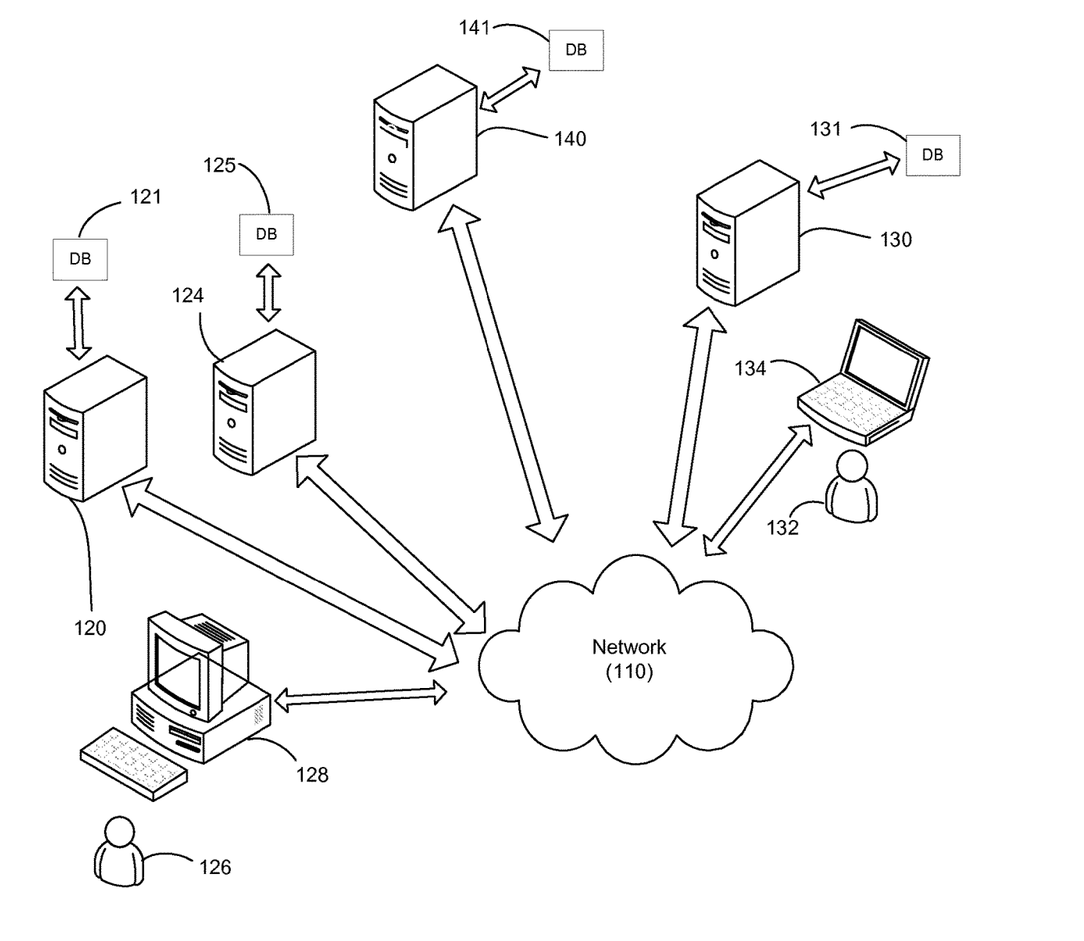
FIG. 1 is a diagram of a system for generating customized, anonymized financial information according to an exemplary embodiment of the invention.

FIG. 1 is a diagram of a system for analyzing financial information and other information according one embodiment of the invention. As shown in FIG. 1, the system includes a network 110 which may comprise one or more of a local area network (LAN), a wide area network (WAN), an intranet and/or the Internet, for example. The network 110 enables communications between various computing and storage devices in the system. The system also includes one or more computer servers that may be owned and/or operated by a financial institution, such as a bank that issues credit cards and debit cards and provides other financial services to its customers and clients. For example, the financial institution may have a server 120 with an associated database 121 that it uses to service and maintain its credit card and debit card accounts for its cardholders. The financial institution may also have a server 124 with an associated database 125 that it uses to provide anonymized, processed (e.g., filtered) financial information to its business clients according to exemplary embodiments of the invention. An employee 126 of the financial institution may access the servers 120, 124 and the associated databases 121, 125 by using a computing device such as desktop computer 128, laptop computer, or tablet computer, for example.

Also shown in FIG. 1 is a server 130 which may be owned and/or operated by a business client of the financial institution. The server 130 may be linked to a database 131 that stores financial and other information of the business client. The business client may have one or more end users 132 who access the system with computing devices 134. The employees of the business client may access the business client server 130 and database 131 and may also be provided limited access to the server 124 and associated database 125 of the financial institution.

FIG. 1 also depicts a server 140 and a database 141 that may be owned and/or operated by a third party. The third party may be a data broker, or it may be another type of entity that stores and provides access to information of interest to the business client. For example, the financial institution may have one or more data sources linked to the financial institution's databases used for purposes of conducting the financial institution's regular business. A secondary or tertiary use of such data may involve correlating such data with credit card and debit transactions data so that the financial institution and the business client can slice the transactional information along useful segmentations such as age, gender, income, and channel usage, for example.

According to one example, the financial institution compiles and stores in the database 125 the following types of data related to customer transactions and to its customers: (a) credit card and debit card transaction information, such as transaction amount, transaction date, merchant name, and merchant category (which may be the merchant category code (MCC) or some other market segment defined by the financial institution and/or business client that is meaningful or helpful to the business client in understanding market dynamics), (b) metadata relating to such transactions such as time of transaction, location of transaction, and card-not-present status of the transaction, (c) existing relationships (e.g., accounts) between the customer and the financial institution, such as consumer banking, small business banking, and mortgage, auto, and student lending relationships with the financial institution, (d) the size of such relationships (e.g., the dollar value of the customer accounts), changes over time in account balances, transactions into and out of such accounts, and overall activity level across cards, (e) facts and estimates related to customers' income, liquid assets, debt, and net worth, (f) customers' interactions across channels, such as bank branches, phone, web, and mobile applications (also commonly referred to as "mobile apps"), (g) geographic and demographic data relating to the customers, such as residence address, gender, age and household size, (h) facts about customers' home ownership (rent vs. own, single vs. multiple dwelling unit), (i) customers' stated or implied language preference, and (j) customers' stated or implied possession of specific access devices such as particular types of smartphones or specific browsers or operating systems; (k) how far the customer generally travels from home to spend money; (l) percent of transactions happening in a customer's home zip code; (m) percent of transactions that are at luxury retailers; (n) "early risers" and other fingerprints related to when a customer habitually spends money relative to the average in the population; and (o) "trendsetters" and other, more complex fingerprints or characteristics that illustrate a customer's pioneering spend at stores where others come to spend in great numbers.

In addition to the aforementioned data, the financial institution may also receive or access additional business client data from the business client. As shown in FIG. 1, the business client may maintain a server 130 and an associated database 131 that stores financial information and other information of the business client. According to one example, the business client may be a hotel chain or a national retailer, such as a national electronics retailer, a national warehouse home products retailer, or a national fast food restaurant chain, that has retail stores throughout the United States. The business client may be interested in understanding the commercial circumstances in various regions of the country. The business client may be interested in combining the business client data that it maintains in its database 131 with data maintained by the financial institution in the financial institution database 125.

The business client data may include, for example, the street address of its stores, historical data on marketing campaign dollars spent, customer attributes that are meaningful to the business client (such as tiered loyalty program membership and known markers of activity per customer, as an airline would typically have on nearly its entire customer base), or geographic boundaries that are unique to the business client (such as the borders defining regional profit & loss (P&L) center or management hierarchies). The store street addresses allow the financial institution to more accurately account for the business client's commercial activities (typically, the financial institution may receive or may store only a zip code). The information on historical marketing campaign dollars spent, when combined with historical financial institution data, allows the business client to observe the results of the marketing campaign in more detail and to correlate the results with various other financial data. Customer segment data allows the business client to break out performance along lines that are actionable from the standpoint of how it runs its day-to-day operations; e.g., if a hotel chain makes separate decisions about how to market its properties for different rewards tiers, it benefits from being able to slice the bank's transaction data natively along the hotel's reward tier lines.

The business client may also request that the financial institution receive and/or access certain data maintained by third parties, such as data brokers or other entities. FIG. 1 depicts a server 140 and database 141 that are owned and/or operated by a third party such as a data broker or another type of entity that maintains data of interest to the business client. The business client may wish to engage a data broker or other entity to provide additional information of interest to the business client.

Once the financial institution, with instructions from the business client, has identified and arranged for access to or has stored the data desired by the business client, the financial institution, with input from the business client, may undertake a process of preparing the data to be accessed by the one or more end users 132 at the business client. The server 124 may include a tool that allows the financial institution and/or the business client to define a relevant set of stores of the business client to be analyzed, select a business segment comprising aggregate data on merchants in the same category, and/or define a set of customized views of the data that tell a useful business story for the end user of the business client. As one example, the tool may allow the financial institution and/or the business client to define a merchant category of interest that comprises a designated number (greater than an appropriate minimum number) of merchants in the same field. This merchant category can then be used by the end user at the business client to filter or analyze various spending activity.

Preparation of the data to be accessed by the business client also includes the implementation of rules by the financial institution server 124 to ensure privacy protection and data security, such that the end users 132 at the business client will only be able to access aggregated, anonymized information. For example, the server 124 can be programmed to provide only aggregated data in a geographic region having a certain minimum population. Similarly, the server 124 can be programmed to maintain the anonymity of data relating to merchants that compete with the business client by requiring a certain minimum level of aggregation. The server 124 can also be programmed to store only masked versions of personally identifiable customer information, even pre-aggregation.

The system 124 may also be programmed to implement a heuristic process on the data to enhance the accuracy or usefulness of the data. For example, the heuristic process may comprise identification of unique store locations (e.g., street addresses), correlation or linking of store locations to merchant names and parent companies at multiple hierarchical layers, accurate classification of merchants by industry, or linking in the database 125 of merchants to structured data sets such as a Dun & Bradstreet data set.

The step of preparing the data may also involve the financial institution offering a service of accepting and executing one or more processing algorithms from the business client. The business client will typically have its own experts in the relevant business, and those experts may devise algorithms to prepare the data for subsequent processing. For example, the business client may provide an algorithm and request that the financial institution execute the algorithm on the data in order to distinguish among multiple sets of competitors (e.g., locals vs. national chains). The business client may also have and provide various "derived factors" (discussed below) that are useful to it in analyzing the data.

According to one embodiment of the invention, the server 124 is programmed to provide a graphical user interface for the end user 132 of the business client that displays a map and various aggregated, anonymized financial and other data related to the map. According to a preferred embodiment, the map comprises a choropleth map that presents the intensity or value of a desired variable, factor, or other value across a desired geographic region using colors, shades or symbols. The graphical user interface allows the end user 132 to select a geographic region having at least a minimum population and to select one or more variables to analyze in the geographical region. The variables may include, for example, aggregate spending, wallet share (i.e., percentage of aggregate spending at the business client relative to aggregate spending at all businesses in the relevant merchant category (e.g., MCC)), spending over time, smoothing of time series with moving averages, and showing number of transactions vs. total spend vs. average transaction size.

The end user 132 may also define a number of processing (e.g., filtering) criteria that can be applied to the one or more variables. For example, end user 132 may define, with respect to the variable being analyzed, (a) a geographic region by zip code, collection of zip codes, neighborhood, county, state, or a shape such as a circle or polygon containing at least a minimum population, (b) an income band (e.g., annual income between $35,000-$45,000) of the individuals, (c) a merchant category, and (d) a time period. As one illustrative example, the end user 132 may choose to view aggregate spending at automotive parts stores (MCC 5533) by individuals residing in the 22201 zip code having an annual income between $40,000 and $50,000 in the month of November 2012. Other filtering criteria may include customer demographic data such as the customer's age or gender or the estimated value of the customer's liquid assets, debt and/or net worth, for example. The processing criteria may be selected by the end user 132 with drop-down menus on the interface, for example. The graphical user interface presented to the end user 132 can be designed to allow the end user 132 to process (e.g., filter) and present the data using any one or any combination of the factors, variables, and other values and parameters described herein. In additional to use of a choropleth map format, for example, the user interface may present information in other formats, such as data tables, bar graphs, or line graphs, for example. In addition, the interface may be designed to accept natural language queries from the end user 132. The interface may also be used to directly compare performance between two or more defined sets of customers, or two or more defined geos or time periods, such as with a bar graph or other visual comparison.

The server 124 may also be programmed to define a set of customized views of the data that tell a useful business story for the end user 132 of the business client. For example, the server 124 may be programmed to define a view, to be displayed on the end user's computing device 134, comprising a map, navigation icons to pan and zoom, a number of drop down menus for the variables and processing criteria, and an interactive display of the processed data that is dynamically updated to show the change in the variable(s) as the processing criteria are changed.

The dynamic updating can be accomplished in a number of ways. For example, the display on the computing device 134 may present a number of data points in a designated window, such as aggregate spending, wallet share of the business client relative to other merchants in the same merchant category, and the total number of customers. The display may also allow the end user 132 to define a geographical region of interest on the map, such as with a circle having a defined radius and containing at least a minimum number of individuals. The user is permitted to move the geographic region by dragging the circle to different places on the map. As the user drags the circle across the map, the data window is dynamically updated to show changes in total spending in the chosen merchant category, wallet share, and the number of customers. In this way, the system can enable the end user 132 to discover economic opportunities in certain geographies. As one example, the end user can discover geographic regions where there are numerous customers having desired demographics but few or no retail stores to fulfill expected demands in a particular merchant category, such as auto parts. The business client may therefore decide to invest in building an auto parts retail store because the customized financial data illustrates an economic opportunity to fulfill a local demand.

According to another embodiment of the invention, the server 124 may be programmed to provide an end user interface for the end user 132 that displays aggregate data on spending trends by consumers in a specified merchant category as well as customer responsiveness to certain marketing campaigns. The end user interface may allow the end user 132 to specify a geographic region, date range, and financial variables to observe, such as spending at their own retail stores (e.g., the end user's fast food restaurants), and aggregate spending in the same merchant category (e.g., all fast food restaurants, or a predefined group of similar restaurants). This data can allow the end user 132 to understand the overall spending trends in its merchant category over time, evaluate its performance in a particular merchant category as compared with total spending in the merchant category, understand its performance across different consumer demographics, and estimate the impact of its interventions, such as marketing campaigns, on consumer spending. This end user interface may also be designed to display data on total spending or another variable in certain age groups, different regions, and different income bands over time. Consequently, the end user 132 may gain valuable insight into, among other things, overall industry trends and where best to allocate its marketing budget based on the success or failure of prior marketing campaigns. The business client can therefore use this data to understand its share of wallet across different customer demographics, and distinguish between industry-wide spending changes and changes affecting only the business client. Other illustrative examples of graphical data that may be useful to the business client include: total spending amongst consumers of ages 25-44, total spending in the northeast United States, total spending in large cities, spending changes, and total wealth of customers.

According to another embodiment of the invention, the server 124 can be programmed to provide a graphical user interface for the end user 132 that displays aggregate data on the time of transactions in a particular geographic region for a specified merchant category. The time of transaction data may be displayed graphically to enable the end user 132 to understand and analyze spending activity by day of the week, time of day, customer segment, merchant category, etc. The end user 132 may use this data to make more informed decisions relating to opening hours, staffing decisions, local marketing campaigns, and timing of promotional offers, for example.

According to another embodiment of the invention, the business client is an internal division of the financial institution. For example, the business client may be a division of the financial institution that is responsible for managing and/or opening new retail bank branches, homeownership centers, or wealth management/private bank branches. The system 124 can be programmed as described above to manage an existing footprint (e.g., evaluating branch performance against other branches with similar geographic opportunity); to facilitate selection of new locations for banking centers (e.g., identifying which branches are most likely to attract small businesses in the area given the local spending data); or to enable the financial institution to evaluate potential partners in the credit card space and determine if different types of collaboration such as merchant-funded offers or partner card relationships would be mutually beneficial.

Additional types of business clients may benefit from the system 124. For example, the system 124 may be programmed to provide improved data analytics for merchant partners of the financial institution. In addition, the system 124 may be programmed to allow customers of the financial institution to compare their spending patterns to customers in similar geographic and demographic circumstances. Also, if the financial institution includes a commercial bank, the system 124 can be programmed to provide financial data analytics for improved underwriting for commercial and development loans based on analysis of economic opportunity surrounding the development site or borrower location. The business client may also be a private equity firm that is interested in conducting analytics to achieve the most prudent investment decisions with respect to a company. Furthermore, the system 124 may be programmed to provide data analytic capabilities to non-profit organizations or local governments to enable them to understand the economic performance in their fields or localities, such as overall "economic vitality" in the region and others, data on spending at local merchants vs. national chains, spending in a region of interest vs. outside that region and consequently the localness of spending by people who live in-region, spending by different age groups, and spending within certain merchant categories. This type of data can be used, for example, by a local government to help local businesses by targeting certain individuals residing in the relevant geographic region with promotional offers for the local businesses.

Other processing or filtering criteria or factors may include card-not-present status of the transaction, existence of additional accounts with the financial institution, dollar value of current accounts with the financial institution, value of customers' liquid assets, debt and/or net worth, and customers' interactions across channels such as through bank branches, phone, web and mobile apps, and other demographic data relating to customers and customer segments.

Additional embodiments of the invention can be designed to provide anonymized, processed information customized for various types of business leaders, such as a chief executive officer (CEO), chief strategy officer (CSO), chief operating officer (COO), chief marketing officer (CMO), regional manager, site manager, or private equity (PE) investor.

For example, one or more of the foregoing persons may be interested in analyzing an "economic vitality index" for a defined geographic area. The economic vitality index can be defined by the financial institution and/or the business client to be a specific combination of values for spending, wealth, and other factor(s) that predict economic growth in a defined time period, for example. The business client may also use a choropleth map to visualize the intensity of the economic vitality index as a function of location and/or time. Other factors that may be of interest include total spending per day, total spending per capita per day, total spending per account or active account per day, a first order derivative that shows the rate of change of such factors, a time animation that shows a time evolution of such factors, a blended metric of wealth, spending per active account, and the direction of such spending, and an index that illustrates utilitarian spending (e.g., hardware) and/or entertainment spending by geography and/or time. These factors may enable to business client to understand in considerable detail where and why the business has gained or lost market share. The data may be presented graphically, such as with a choropleth map, and/or in numerical or tabular form in a data table, for example.

Exemplary embodiments of the invention may help various members of the business client to understand important information, such as: (a) where the business has gained or lost market share in the aggregate, (b) what are the demographic attributes of its customers, (c) what is the change in market share within each demographic segment, (d) what is the business's market share by time and date segment, (e) whether additional investment in a particular geographic region is likely to produce an acceptable return, (f) what is the best strategy for promotion to impact market share, (g) what ad campaigns have been rolled out, at which times, in which markets, targeting which demographics, (h) what is the growth potential of the business, (i) what would be the sales increase if the business were to obtain a certain percentage increase in addressable spend in certain demographics/segments/distance, (j) given a fixed industry, should the business enter a new market, (k) should the business enter an adjacent industry in its existing markets, (l) what other industries do the customers of the business have a spend correlation with, (m) where should the business build its next store, (n) which store(s) should the business close, (o) where can the business reduce its investment and/or save money with the least impact on the bottom line, (p) how are the customers reacting to the latest promotion, (q) is a promotion effective, and amongst which customer segments, (r) how are various stores of the business client performing relative to the economic opportunity, (s) where is the business gaining or losing market share, (t) which parts of the day, week and/or month is the business successful on an absolute basis and relative to market share, and (u) in which customer segments does the business have the most volume.

The interface for the end user of the business client may present the following additional factors and considerations: (1) a choropleth map to visualize trends in different demographics in total industry spending in a particular merchant category, (2) a segmentation by gender, age, wealth, and income, (3) an identification and/or graphical depiction of the largest customers of the business, (4) a chart or graphical depiction of total sales and percent of market share before and after a regional or national promotion, (5) a choropleth map showing changes before and after an event or campaign, (6) normalization of the data for one or more seasons or time periods, (7) a decay curve showing the decline in spending as time passes after a promotion.

Additional factors that may be presented to the end user alone or in various combinations include: home location, location of spending, individual balance sheet characteristics, home value, credit limit, ratio of debit to credit spending, size of household, and language, for example.

The system may also be designed to present one or more customer-level "derived factors," such as average travel distance or time to spending location, percentage of transactions taking place within one mile of home, percentage of spending on luxury items, ratio of income to wealth, percentage of spending on children, brand loyalty as exhibited by the concentration of spending within a predefined category or code, number of transactions over $100, number of ATM withdrawals, and a trendsetter derived factor where such spending predicts spending of others.

The system may also be designed to present one or more merchant-level derived factors, such as the number of unique customers per store, customer loyalty as exhibited by the percentage of customers that go to a store more than a specified number of times, and a time of day distribution for spending.

The presentation of the data to the end user at the business client can take other forms according to exemplary embodiments of the invention. For example, the system may be designed to present a blended overall map with mini-maps showing industry spending, wealth, and any other desired factor or derived factor. The graphical user interface can be designed by the financial institution and/or the business client to have a number of filtering or processing criteria that are selectable by the end user on the graphical user interface. As discussed above, the graphical user interface may include a choropleth map showing aggregate spending in a geographic region, and the end user is able to filer and/or process the data (e.g., aggregate spending) with a number of drop down menus on the data being viewed, the time period, merchant category, gender, age, household income, etc. The graphical user interface can also include a line graph showing one or more desired factors over time, such as aggregate spending. The system may be designed to also present comparisons of various data, such as with bar graphs to show financial data at two distinct time periods (e.g., April vs. May spending).

Other graphical information that can be presented on the user interface (e.g., overlaid on the financial information) includes alphanumeric or graphical information relating to traffic, weather, crime, and images from a web camera, for example. The system can be designed to present such information in real time, thus allowing the business client to react quickly to various economic or other activities taking place near its stores, or otherwise affecting or relevant to its stores, for example. According to other embodiments of the invention, the system can be designed to provide certain alerts to the end user 132, such as when a factor being analyzed exceeds a certain predefined limit. The alerts may be communicated in any desired form such as a pop up window on the user interface, a text message, or an email message, for example.

Exemplary embodiments of the invention can also be designed to include functionality to save certain views or depictions of the data discovered by the end user 132. For example, the end user 132 may spend time changing a number of factors or variables to analyze data and gain a more thorough understanding of the market dynamics in a particular set of circumstances or filtering criteria. When the end user has found the combination of factors and graphical depiction that effectively conveys a concept, he or she can then save that configuration on the system for later presentation to others at the business client. The system can also be designed to allow the end user to retrace his or her past inquiries so as to facilitate the data analysis process.

While the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 210 and 212 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. Communications network, e.g., 110, may also comprise a telephone communications network, such as the Public Switched Telephone Network (PSTN). In another embodiment, communication network 120 may comprise a Personal Branch Exchange (PBX), which may further connect to the PSTN.

Although examples of user communication devices 128, 134 are shown in FIG. 1, exemplary embodiments of the invention may utilize other types of communication devices, such as tablet computers or smartphones, whereby a user may interact with a network that transmits and delivers data and information used by the various systems and methods described herein. The user communication device may include a microprocessor, a microcontroller or other device operating under programmed control. The user communication device may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The user communication device may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The user communication device may also include a network-enabled appliance, a browser-equipped or other network-enabled cellular telephone, or another TCP/IP client or other device.

As described above, FIG. 1 includes a number of servers 120, 124, 130, 140 and user communication devices 128, 134, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, or simply software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the communication devices 128, 134. As used herein, a user interface may include any hardware, software, or combination of hardware and software used by the processor that allows a user to interact with the processor of the communication device. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface is any device that provides communication between a user and a processor. The information provided by the user to the processor through the user interface may be in the form of a command, a selection of data, or some other input, for example.

As discussed above, a user interface is utilized by the processor that performs a set of instructions such that the processor processes data for a user. The user interface is typically used by the processor for interacting with a user either to convey information or receive information from the user. However, it should be appreciated that in accordance with some embodiments of the invention, it is not necessary that a human user actually interact with a user interface used by the processor. Rather, it is contemplated that the user interface of the invention might interact, i.e., convey and receive information, with another processor, rather than a human user.

Although the embodiments of the present invention have been described herein in the context of a particular implementation in a particular environment for a particular purpose, those skilled in the art will recognize that its usefulness is not limited thereto and that the embodiments of the present invention can be beneficially implemented in any number of environments for any number of purposes.

What is claimed is:

1. A method for generating improved graphical user interfaces (GUIs) integrated with delivering an analysis of anonymized cardholder transaction data over a network, the method comprising:

providing, by a computing device, an interactive GUI for the merchant partner to view and manipulate an interactive report;

receiving, by the computing device, cardholder transaction data associated with the merchant partner sent from a data source over a network;

storing, by the computing device, cardholder transaction data associated with the merchant partner and maintained by the financial institution in at least one database;

analyzing, by the computing device, the cardholder transaction data;

anonymizing, by the computing device, the cardholder transaction data to safeguard the privacy of the cardholders;

encrypting, by the computing device, the anonymized cardholder transaction data;

decrypting, by the computing device, the encrypted anonymized cardholder transaction data;

generating, by the computing device, the interactive report for the merchant partner based on the decrypted anonymized cardholder transaction data, wherein the interactive report comprises data analytics presented in an interactive map including selectable variables for analysis with reference to a user-defined region, wherein the data analytics include economic vitality index defined as a specific combination of values for spending, wealth, and factors that predicts economic growth in a defined time period for a defined geographic location, wherein the interactive map is a choropleth map that illustrates an intensity of the economic vitality index as a function of the defined geographic location and the defined time period;

dynamically updating, by the computing device, a display of information related to the interactive map based on user selection of variables and the user defined region in real time, wherein the user selection of variables include one or more of the following customer spending trends comprising spending per day, total spending per capita per day, total spending per account or active account per day, a first order derivative that shows the rate of change of the various factors, and a time animation that shows a time evolution of the various factors, and trends in different demographics in total industry spending in a particular merchant category, wherein the dynamically update includes updating the choropleth map to display on the computing device that presents a plurality of data points in a designated window corresponding to the user selection of variables;

generating, by the computing device, an alert when a selected variable exceeds a predetermined threshold and displays the alert as a pop-up window on the interactive GUI; and providing, by the computing device, the interactive report and the anonymized cardholder transaction data to the merchant partner through the interactive GUI.

2. The method of claim 1, wherein:

the data analytics comprise aggregated cardholder transaction data associated with at least one customer spending trend at the merchant partner;

the customer spending trend comprises cardholder transaction data aggregated according to a day of the week;

the customer spending trend comprises cardholder transaction data aggregated according to weather conditions;

the customer spending trend comprises cardholder transaction data aggregated according a product or service offered by the merchant partner;

the data analytics comprise aggregated cardholder transaction data associated with at least one customer spending trend for new customers at the merchant partner;

the data analytics comprise aggregated cardholder transaction data associated with at least one customer spending trend for returning customers at the merchant partner; and the data analytics comprise aggregated cardholder transaction data associated with customer loyalty data.

3. The method of claim 1, wherein the data analytics comprise comparing, by the computing device, aggregated cardholder transaction data associated with the merchant partner with a second set of data associated at least one other business in a similar merchant category to the merchant partner.

4. A transaction management computing device comprising:

a processor;

a memory, wherein the memory coupled to the processor which is configured to execute programmed instructions stored in the memory comprising:

provide an interactive graphical user interface (GUI) for the merchant partner to view and manipulate an interactive report;

receive cardholder transaction data associated with the merchant partner sent from a data source over a network;

store cardholder transaction data associated with the merchant partner and maintained by the financial institution in at least one database;

analyze the cardholder transaction data;

anonymize the cardholder transaction data to safeguard the privacy of the cardholders;

encrypt the anonymized cardholder transaction data;

decrypt the encrypted anonymized cardholder transaction data;

generate the interactive report for the merchant partner based on the decrypted anonymized cardholder transaction data, wherein the interactive report comprises data analytics presented in an interactive map including selectable variables for analysis with reference to a user-defined region, wherein the data analytics include economic vitality index defined as a specific combination of values for spending, wealth, and factors that predicts economic growth in a defined time period for a defined geographic location, wherein the interactive map is a choropleth map that illustrates an intensity of the economic vitality index as a function of the defined geographic location and the defined time period;

dynamically update a display of information related to the interactive map based on user selection of variables and the user defined region in real time, wherein the user selection of variables include one or more of the following customer spending trends comprising spending per day, total spending per capita per day, total spending per account or active account per day, a first order derivative that shows the rate of change of the various factors, and a time animation that shows a time evolution of the various factors, and trends in different demographics in total industry spending in a particular merchant category, wherein the dynamically update includes updating the choropleth map to display on the computing device that presents a plurality of data points in a designated window corresponding to the user selection of variables;

generate an alert when a selected variable exceeds a predetermined threshold and displays the alert as a pop-up window on the interactive GUI; and provide the interactive report and the anonymized cardholder transaction data to the merchant partner through the interactive GUI.

5. The device as set forth in claim 4 wherein:

the data analytics comprise aggregated cardholder transaction data associated with at least one customer spending trend at the merchant partner;

the customer spending trend comprises cardholder transaction data aggregated according to a day of the week;

the customer spending trend comprises cardholder transaction data aggregated according to weather conditions;

the customer spending trend comprises cardholder transaction data aggregated according to a product or service offered by the merchant partner;

the data analytics comprise aggregated cardholder transaction data associated with at least one customer spending trend for new customers at the merchant partner;

the data analytics comprise aggregated cardholder transaction data associated with at least one customer spending trend for returning customers at the merchant partner; and the data analytics comprise aggregated cardholder transaction data associated with customer loyalty data.

6. The device as set forth in claim 4 wherein the data analytics comprises comparing aggregated cardholder transaction data associated with the merchant partner with a second set of data associated at least one other business in a similar merchant category to the merchant partner.

7. A non-transitory computer readable medium having stored thereon instructions for delivering an analysis of anonymized cardholder transaction data over a network comprising executable code which when executed by a processor, causes the processor to:

provide an interactive graphical user interface (GUI) for the merchant partner to view and manipulate an interactive report;

receive cardholder transaction data associated with the merchant partner sent from a data source over a network;

store cardholder transaction data associated with the merchant partner and maintained by the financial institution in at least one database;

analyze the cardholder transaction data;

anonymize the cardholder transaction data to safeguard the privacy of the cardholders;

encrypt the anonymized cardholder transaction data;

decrypt the encrypted anonymized cardholder transaction data;

generate the interactive report for the merchant partner based on the decrypted anonymized cardholder transaction data, wherein the interactive report comprises data analytics presented in an interactive map including selectable variables for analysis with reference to a user-defined region, wherein the data analytics include economic vitality index defined as a specific combination of values for spending, wealth, and factors that predicts economic growth in a defined time period for a defined geographic location, wherein the interactive map is a choropleth map that illustrates an intensity of the economic vitality index as a function of the defined geographic location and the defined time period;

dynamically update a display of information related to the interactive map based on user selection of variables and the user defined region in real time, wherein the user selection of variables include one or more of the following customer spending trends comprising spending per day, total spending per capita per day, total spending per account or active account per day, a first order derivative that shows the rate of change of the various factors, and a time animation that shows a time evolution of the various factors, and trends in different demographics in total industry spending in a particular merchant category, wherein the dynamically update includes updating the choropleth map to display on the computing device that presents a plurality of data points in a designated window corresponding to the user selection of variables;

generate an alert when a selected variable exceeds a predetermined threshold and displays the alert as a pop-up window on the interactive GUI; and provide the interactive report and the anonymized cardholder transaction data to the merchant partner through the interactive GUI.

8. The medium as set forth in claim 7 wherein:

the data analytics comprise aggregated cardholder transaction data associated with at least one customer spending trend at the merchant partner;

the customer spending trend comprises cardholder transaction data aggregated according to a day of the week;

the customer spending trend comprises cardholder transaction data aggregated according to weather conditions;

the customer spending trend comprises cardholder transaction data aggregated according to a product or service offered by the merchant partner;

the data analytics comprise aggregated cardholder transaction data associated with at least one customer spending trend for new customers at the merchant partner;

the data analytics comprise aggregated cardholder transaction data associated with at least one customer spending trend for returning customers at the merchant partner; and the data analytics comprise aggregated cardholder transaction data associated with customer loyalty data.

9. The medium as set forth in claim 7 wherein the data analytics comprises comparing aggregated cardholder transaction data associated with the merchant partner with a second set of data associated at least one other business in a similar merchant category to the merchant partner.

* * * * *